US008051624B2

(12) United States Patent
Mead

(10) Patent No.: US 8,051,624 B2
(45) Date of Patent: Nov. 8, 2011

(54) ACCESS FLOOR GROUNDING FASTENER

(75) Inventor: Bruce Mead, Mississauga (CA)

(73) Assignee: Kingspan Holdings (IRL) Ltd., Kingscourt, Co. Cavan (IE)

( * ) Notice: Subject to any disclaimer, the term of this patent is extended or adjusted under 35 U.S.C. 154(b) by 0 days.

(21) Appl. No.: 12/285,669

(22) Filed: Oct. 10, 2008

(65) Prior Publication Data

US 2009/0113844 A1 May 7, 2009

Related U.S. Application Data

(63) Continuation of application No. 11/010,337, filed on Dec. 14, 2004, now abandoned.

(30) Foreign Application Priority Data

Jul. 23, 2004 (CA) ...................................... 2476046

(51) Int. Cl.
*E04B 5/43* (2006.01)
*F16B 23/00* (2006.01)

(52) U.S. Cl. ....... 52/747.1; 52/263; 52/220.1; 52/126.6; 411/188

(58) Field of Classification Search ................. 52/220.1, 52/126.6, 220.5, 126.5, 126.7, 263; 411/187, 411/188, 399, 143, 144, 145, 162, 163, 185, 411/186

See application file for complete search history.

(56) References Cited

U.S. PATENT DOCUMENTS

| | | | | |
|---|---|---|---|---|
| 1,175,665 | A * | 3/1916 | Sweet | 411/403 |
| 2,147,209 | A * | 2/1939 | Olson | 411/187 |
| 3,640,326 | A * | 2/1972 | Brown | 411/188 |
| 4,277,923 | A | 7/1981 | Rebentisch et al. | 52/126.6 |
| 4,655,661 | A * | 4/1987 | Brandt | 411/387.1 |
| 4,665,661 | A | 5/1987 | Kobayashi et al. | 451/32 |
| 4,719,727 | A | 1/1988 | Cooper et al. | 52/126.6 |
| 4,764,066 | A * | 8/1988 | Terrell et al. | 411/187 |
| 4,863,390 | A | 9/1989 | Cera et al. | |
| 4,976,627 | A | 12/1990 | O'Laughlin | |
| 5,183,359 | A * | 2/1993 | Barth | 411/188 |
| 5,199,839 | A * | 4/1993 | DeHaitre | 411/387.3 |
| 5,356,253 | A | 10/1994 | Whitesell | 411/188 |
| 5,389,737 | A | 2/1995 | Kobayashi et al. | 174/483 |
| 5,499,476 | A | 3/1996 | Adams et al. | 52/220.1 |
| 5,516,248 | A * | 5/1996 | DeHaitre | 411/387.2 |
| 5,570,983 | A | 11/1996 | Hollander | 411/386 |
| 5,683,217 | A | 11/1997 | Walther et al. | 411/399 |
| 5,772,376 | A * | 6/1998 | Konig | 411/399 |
| 5,888,104 | A | 3/1999 | Mello et al. | |
| 6,256,952 | B1 | 7/2001 | Fahy et al. | 52/263 |
| 6,302,629 | B1 | 10/2001 | Hsiao | 411/187 |
| 6,343,904 | B1 | 2/2002 | Wang | 411/368 |
| 6,394,725 | B1 * | 5/2002 | Dicke | 411/399 |
| 6,698,987 | B1 * | 3/2004 | Dicke | 411/387.6 |
| 2002/0144477 | A1 | 10/2002 | Chen | 52/263 |
| 2003/0051420 | A1 | 3/2003 | Leon | 52/126.6 |
| 2003/0177723 | A1 * | 9/2003 | Jakob-Bamberg et al. | 52/263 |

FOREIGN PATENT DOCUMENTS

| | | |
|---|---|---|
| WO | WO 00/61958 | 10/2000 |

* cited by examiner

*Primary Examiner* — Brian Glessner
*Assistant Examiner* — Jessie Fonseca
(74) *Attorney, Agent, or Firm* — Jacobson Holman PLLC

(57) ABSTRACT

A fastener for connecting a panel to a support, the fastener having at least one projection for penetrating the panel surface upon fastening of the panel to the support, thereby making electrical contact thereto.

3 Claims, 2 Drawing Sheets

ACCESS FLOOR GROUNDING FASTENER

CROSS-RELATED APPLICATIONS

This application is a continuation of application Ser. No. 11/010,337, filed Dec. 14, 2004, now abandoned.

FIELD OF THE INVENTION

This invention relates generally to a fastener for connecting a panel to support where the fastener has at least one projection for penetrating the panel surface to make electrical contact thereto. The invention also relates to a method of grounding a floor panel in a grid defined by a plurality of raised floor panels in side by side relation supported at their corners by a pedestal.

BACKGROUND OF THE INVENTION

Access floor systems or elevated floor structures have gained much popularity with the introduction of computer systems. Such elevated floor structures comprise a series of square, rectangular or triangular panels that are supported by an under-structure to elevate the panels off the building sub-floor. Such under-structure can include pedestals. In particular, a popular arrangement comprises rectangular panels in side by side relation supported by a pedestal where one pedestal supports the corners of four panels thereon. The cavity produced between the underside of the access floor and the building sub-floor is used to run electrical cables, voice and data cables, HVAC and other services.

The access floor panels may be made of wood, aluminium, hollow steel, cement, plastic, cement-filled steel or the like.

It is important for the safety of individuals working on the floor and for the efficiency of operation of equipment, particularly computer equipment, that the access floor is grounded to the building ground system. This is usually accomplished by having the pedestal of the understructure positively attached to the building ground system. Accordingly it is important that the pedestal have metal to metal contact with the floor panel.

Generally speaking such floor panels can be comprised of metal such as steel or the like and have a protective coating such as enamel, paint, or epoxy powdered coat. Accordingly it is necessary to remove a portion of the paint on the panel to make good electrical contact for grounding. Furthermore it is also required to have the panel and pedestal under pressure where the metal to metal contact occurs in order to have a positive continuous ground less than 1 ohm resistance.

Various arrangements have heretofore been used in order to improve the electrical grounding characteristics of structures. For example U.S. Pat. No. 5,888,104 illustrates an electrical grounding connector comprising a U-bolt, an upper clamp part and a lower clamp part. The upper clamp part is connected to the U-bolt to clamp a floor pedestal therebetween. The lower clamp part is connected to the U-bolt to clamp a conductor between the upper and lower clamp parts. The upper clamp part has a plurality of barbs therein to penetrate through paint on the floor pedestal.

Moreover U.S. Pat. No. 4,976,627 teaches an electrical connector for mechanically and electrically connecting conductors. The connector includes a connector body formed of conductive metal.

Finally, U.S. Pat. No. 4,863,390 teaches a ground connector for securing a ground conductor with respect to a vertical support post. The connector includes a body member, a hook member and fastening means for securing the body and hook members to the support posts.

SUMMARY OF THE INVENTION

It is an object of this invention to provide an improved fastener for connecting a panel to a support where the fastener has at least one projection for penetrating the panel surface. It is a further object of this invention to provide an improved method of grounding a floor panel in a grid defined by a plurality of panels supported by a plurality of pedestals.

It is an aspect of this invention to provide a fastener for connecting a panel to a support, comprising at least one projection for penetrating said panel surface upon fastening of the panel to said support and make electrical contact thereto.

It is another aspect of this invention to provide an access floor comprising a pedestal, a floor panel supported by said pedestal; a rotatable fastener having at least one surface penetrating projection to remove a protective coating when fastening said panel to said pedestal and make electrical contact between said panel and pedestal.

It is yet another aspect of this invention to provide a method of grounding a floor panel in a grid defined by a plurality of raised floor panels each having a protective coating in side by side relation supported at their corners by a pedestal, comprising rotating a fastener and having a projection into said corner and fastening said panel to said pedestal, and removing said protective coating in the vicinity of said fastener to produce a continuous electrical contact with said panels and pedestals.

These and other objects and features of the invention shall now be described in relation to the following drawings.

DETAILED DESCRIPTION OF THE PREFERRED EMBODIMENTS

Figure 1:
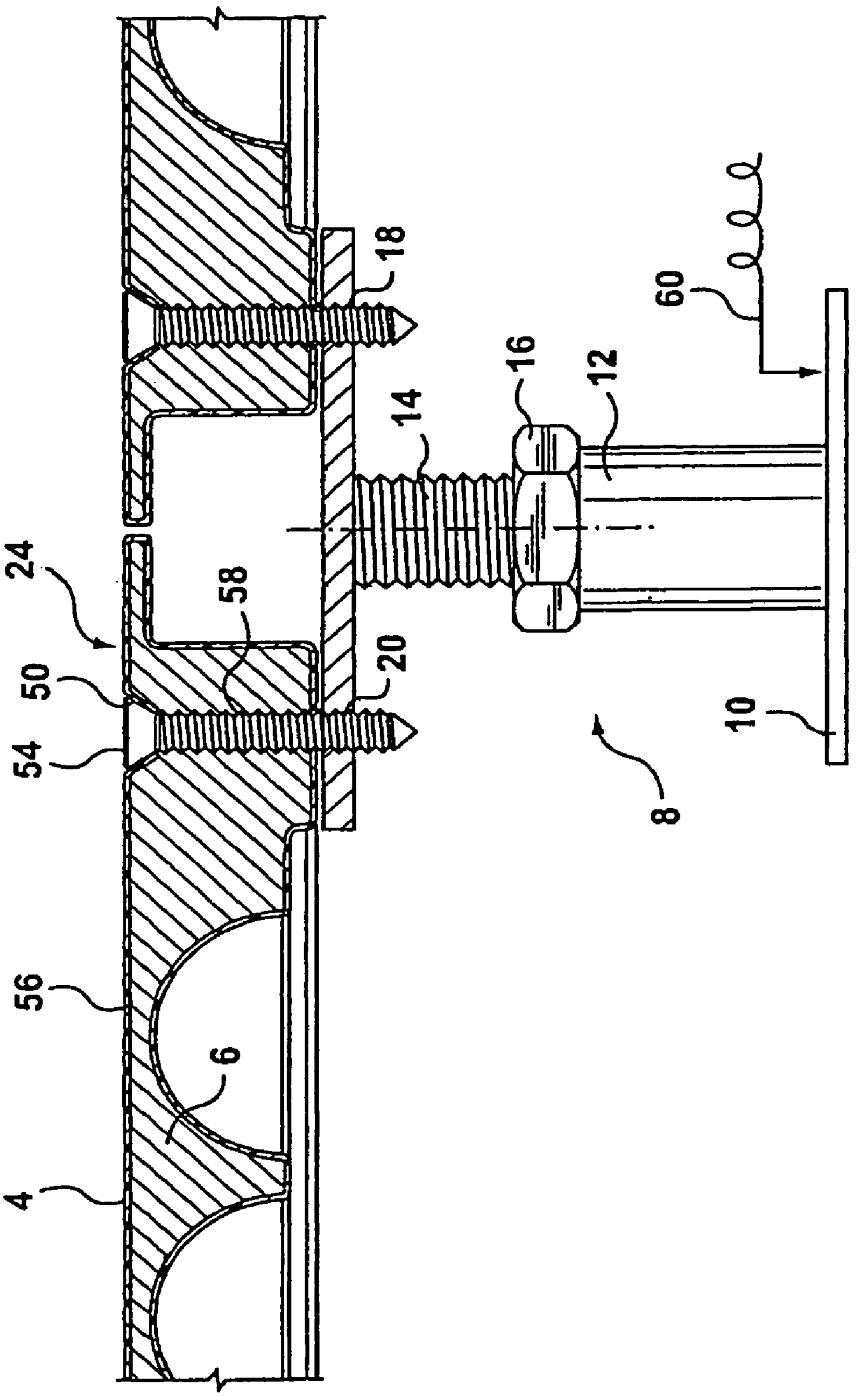
FIG. 1 is a partial cross-sectional view of the panels supported by a pedestal including the fastener.

The invention describe herein includes a fastener 2 for cutting through a painted or coated surface or to produce metal to metal contact. Fastener 2 also acts as a fastener which clamps the panel 6 to the pedestal 8. The pedestal 8 generally comprises a pedestal base 10 presenting an upstanding column 12 and a threaded column 14 which engages the column 12 in a manner well-known to those persons skilled in the art and includes a lock nut 16 so as to adjust the height of the pedestal head plate 18 to a desired position above the base 10. The pedestal head plate 18 includes generally four fastening holes 20 which are threaded and adapted to receive the fasteners 2. Alternatively the fasteners can be self-threading into holes 20. The pedestal head plate 18 may be comprised of metal which is not coated or alternatively may also include a protective coating in which event the threads 22 of the fastener 2 will remove the protective coating in holes 20 when the screw or fastener 2 is threaded to the threaded hole 20 of the pedestal head plate 18.

Each access floor panel 6 requires a hold down fastener 2 in each corner 24 of the panel 6 to prevent the panel 6 from moving relative to the pedestal 8 and so as to make the panel 6 and the pedestal 8 one structural component.

The fastener 2 includes at least one projection 30.

Figure 2:
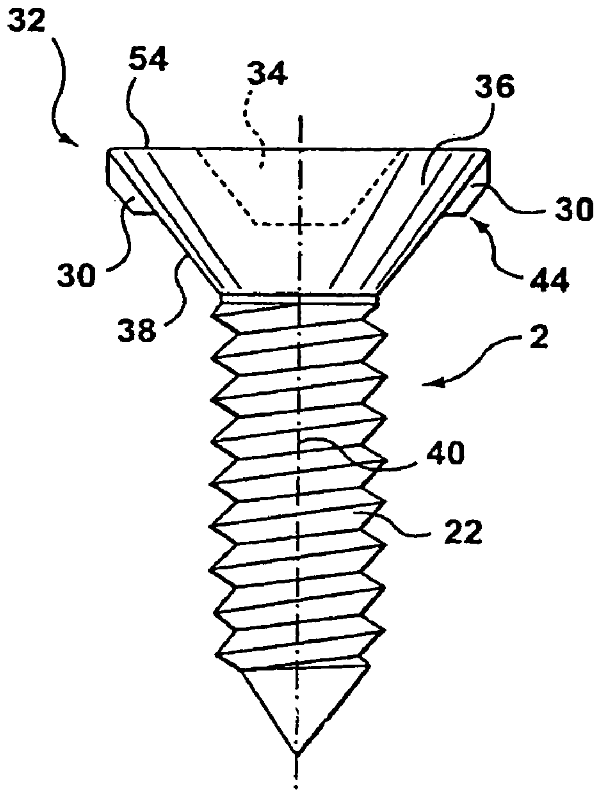
FIG. 2 is a side-view of the fastener.
Figure 3:
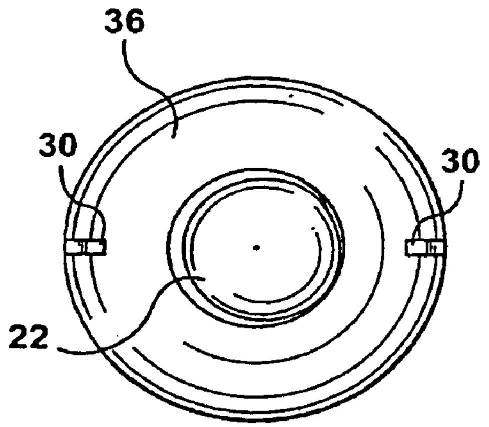
FIG. 3 is a bottom-view of the fastener.
Figure 4:
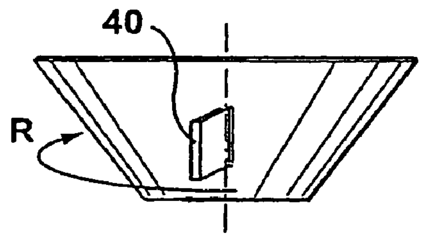
FIG. 4 is a side-elevational view of the projection where the surface removing means is presented in the direction of rotation.
Figure 5:
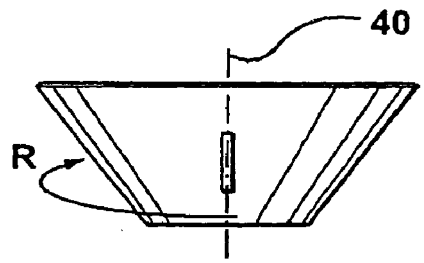
FIG. 5 is a side-elevational view showing a symmetrical surface removing means disposed above the axis of the screw.
Figure 6:
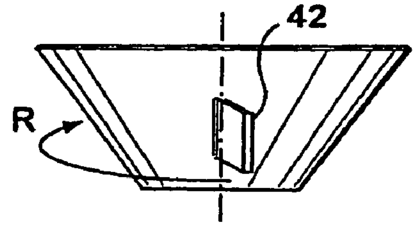
FIG. 6 is a side-elevational view of the fastener including a surface removing means disposed on the trailing edge of the projection.

The embodiment shown in FIG. 2 illustrates two projections 30 disposed at opposite radial sides of the fastener head 32. The fastener head 36 has a socket 34 for a screwdriver (not shown). The embodiment showing the size of the screw head 36 has angled or countersunk sides 38. The countersunk sides 38 present a generally frusto-conical surface for presenting the projections 30. The projections 30 define the protective surface removing means which as shown comprise of two teeth 30. The projections or teeth 30 may be symmetrically disposed about the axis 40 as shown in FIG. 5. Alternatively, the projections 30 may have a leading edge 40 which is disposed in the direction of rotation or a trailing edge 42 as shown in FIG. 6, each of the surface penetrating projections having a leading edge and a trailing edge, and a free end of the projections terminating in a flat surface. A point on at least one of the leading and trailing edges extending in a first plane through a longitudinal centerline of the fastener. Each projection having a thickness defined by a first major side wall and second major side wall, at least one of the first or second major side walls of one of the projections being coplanar with a second plane that intersects the first plane at a line of intersection parallel to the longitudinal centerline.

More particularly the projections 30 are raised embossments have a surface removing edge 44 which is adapted to remove the protective surface of a panel.

Accordingly the teeth 30 are added to the fastener 2 in the area of the head 36. The fastener 2 is recessed into the recess 50 as shown in FIG. 1 in the panel 2 with its top horizontal surface 54 flush or lower than the top horizontal 56 of the panel 6 as shown. Alternatively the top 54 of fastener 2 may be lower than the top 56 of the horizontal surface of the floor panel 6.

The fastener 2 projects through the panel 6 in an appropriate hole 58 disposed through the panel 6 and threads into the hole 20 in the pedestal 8. Teeth 30 on the fastener 2 during its final rotation cuts through the protective panel coating 4 of the panel 6 and makes a positive metal to metal contact with the panel 6 joining the pedestal 8 and panel 6. In one embodiment for example such joinder occurs with less than 1 ohm resistance.

The teeth or outward embossments 30 are shaped such that they remove any protective coating upon contact during the panel fastening procedure.

Such a process allows for positive grounding of the panel while fastening the panel to the pedestal. The pedestal may then be grounded to the building as shown by numeral 60 which is connected to the pedestal base 10 as shown in FIG. 1. Such connection is pursuant to local code requirements in order to complete the grounding of the entire access floor system. More particularly, a plurality of panels 6 are disposed in side by side relation in a grid pattern and supported by a plurality of pedestals where the pedestals support four adjacent corners of panels.

It has generally been found in one example that if the coating 4 is removed from any part of the panel 6 there is generally less than 1 ohm resistance between the panel 6 and the pedestal 8.

The invention described herein illustrates the fastener 2 for connecting a panel 6 to a support 8 comprising at least one projection 30 for penetrating the panel surface 4 upon fastening panel 6 to the support beam and make electrical contact thereto.

Furthermore the invention describes herein an access floor having a pedestal 8, a floor panel 6 supported by the pedestal 8 and a rotatable fastener 2 having at least one surface penetrating projection 30 for removing a protective coating 4 when fastening the panel 6 to the pedestal 8 and make electrical contact between the panel 6 and the pedestal 8. The invention described herein illustrates a method of grounding a floor panel 6 in a grid defined by a plurality of raised floor panels 6 each having a protective coating 4 in side by side relation supported at their corners by a pedestal 8 by (a) rotating a fastener 2 having a projection 30 into said corner and fastening said panel 6 to said pedestal (b) removing the protective coating 4 in the vicinity of the fastener 2 to produce a continuous electrical contact with said panels and pedestals.

Other variations and modifications of the invention are possible. All such modifications or variations are believed to be within the sphere and scope of the invention as defined by the claims appended hereto.

I claim:

1. A method of grounding a floor panel in a grid defined by a plurality of raised floor panels in side by side relation supported at their corners by a pedestal, said method comprising:

providing a plurality of floor panels having a protective coating and a countersunk hole;

providing a fastener having a fastener head and a shank extending from the head, the fastener head having a frusto-conical side wall and the fastener head having surface penetrating projections extending only from the frusto-conical side wall, each of the surface penetrating projections having a leading edge, a trailing edge and a thickness defined by a first major side wall and second major side wall, and a free end of the projections terminating in a flat surface, a point on at least one of the leading and trailing edges extending in a first plane through a longitudinal centerline of the fastener, at least one of said first and second major side walls of one of said surface penetrating projections being coplanar with a second plane, said second plane intersecting said first plane at a line of intersection parallel to said longitudinal centerline; and rotating said fastener in said countersunk hole to remove a portion of the protective coating and thereby making electrical contact with said panels and said pedestal to produce a continuous ground of less than 1 ohm resistance.

2. The method as claimed in claim 1, wherein said panels are metallic, and said fastener produces metal to metal contact between said panels and said pedestal.

3. The method as claimed in claim 2, wherein said protective coating is one of enamel, paint and an epoxy powdered coating.

* * * * *